US008510298B2

(12) United States Patent  
Khandelwal

(10) Patent No.: US 8,510,298 B2  
(45) Date of Patent: Aug. 13, 2013

(54) METHOD FOR RELEVANCY RANKING OF PRODUCTS IN ONLINE SHOPPING

(75) Inventor: Shashikant Khandelwal, Mountain View, CA (US)

(73) Assignee: TheFind, Inc., Mountain View, CA (US)

( * ) Notice: Subject to any disclaimer, the term of this patent is extended or adjusted under 35 U.S.C. 154(b) by 0 days.

(21) Appl. No.: 11/881,950

(22) Filed: Jul. 30, 2007

(65) Prior Publication Data

US 2008/0033939 A1 Feb. 7, 2008

Related U.S. Application Data

(60) Provisional application No. 60/835,556, filed on Aug. 4, 2006.

(51) Int. Cl.
*G06F 17/30* (2006.01)
*G06F 15/16* (2006.01)

(52) U.S. Cl.
USPC ........................................ 707/731; 707/948

(58) Field of Classification Search
USPC ...................... 707/1, 723, 731, 948
See application file for complete search history.

(56) References Cited

U.S. PATENT DOCUMENTS

| 6,236,990 | B1 * | 5/2001 | Geller et al. ................. 707/5 |
| 6,714,933 | B2 * | 3/2004 | Musgrove et al. .............. 707/10 |
| 7,249,126 | B1 * | 7/2007 | Ginsburg et al. ............. 707/749 |
| 7,302,429 | B1 * | 11/2007 | Wanker ............................. 707/7 |
| 7,418,447 | B2 * | 8/2008 | Caldwell et al. .............. 707/100 |
| 2002/0013735 | A1 * | 1/2002 | Arora et al. ..................... 705/26 |
| 2002/0138481 | A1 * | 9/2002 | Aggarwal et al. ................ 707/6 |
| 2003/0195877 | A1 * | 10/2003 | Ford et al. ......................... 707/3 |
| 2004/0019536 | A1 * | 1/2004 | Ashkenazi et al. ............. 705/27 |
| 2004/0068413 | A1 * | 4/2004 | Musgrove et al. ............... 705/1 |
| 2006/0112099 | A1 * | 5/2006 | Musgrove et al. ............... 707/7 |
| 2006/0241901 | A1 * | 10/2006 | Hanus et al. ................. 702/179 |
| 2007/0038620 | A1 * | 2/2007 | Ka et al. ............................ 707/5 |
| 2007/0073641 | A1 * | 3/2007 | Perry et al. ....................... 707/2 |

* cited by examiner

*Primary Examiner* — Usmaan Saeed
*Assistant Examiner* — Brittany N McCue
(74) *Attorney, Agent, or Firm* — William L. Botjer

(57) ABSTRACT

A method, system and computer program product for ranking of products related to a product category in online shopping. A search query for one or more products is received from a user. A set of attributes and features of each attribute are extracted related to a product category for each of the one or more products. A score of each attribute is calculated based on the features. Further, the weights are assigned to each of the one or more attributes and a product rank is generated for each of the one or more products based on assigned weights and the score by using a predefined relevancy-ranking algorithm.

53 Claims, 3 Drawing Sheets

METHOD FOR RELEVANCY RANKING OF PRODUCTS IN ONLINE SHOPPING

REFERENCE TO RELATED APPLICATIONS

This application claims priority of U.S. provisional patent application Ser. No. 60/835,556 filed Aug. 4, 2006; the disclosure of which is hereby incorporated by reference.

BACKGROUND

The present invention relates to relevancy ranking in an information retrieval system. More specifically, the present invention relates to a method and system for relevancy ranking of products in online shopping.

The Internet has enabled online shopping, which has become popular because of its ease of use and fast processing. Further, it enables users to track down the vendors of a product online, and provides them with the facility of instant comparison of prices. This has made online shopping time-efficient and convenient, compared to conventional shopping. Search algorithms on the Internet help buyers to find any product from the multitude of products available online. Hence, a buyer can easily collect information about a product of his/her choice and purchase it accordingly.

However, the information available on the Internet is unstructured and unmanageable. Search engines provide results that have been sorted out to provide those that are relevant to the users, to help them search for products while shopping online. The sorting of results is based on context-based analysis of information, link analysis, or page-ranking algorithms. The results may be sorted, for example, based on the web pages that are frequently visited.

However, online product shopping is different from typical web search. For example, a query 'blue shirt' using existing search techniques would yield all type of results such as merchant pages, reviews, wikipedia entries, personal webpages, music bands, etc. This means the search results may not be related to the user intent—where the user expects to see a list of merchants selling blue colored shirts online with pictures and prices. Hence, the use of the existing web or content search techniques in online shopping may not yield relevant results. Further, the existing online shopping search techniques do not rank the search results, i.e., products based on product attributes such as brand, style, trend, and the like. Ranking products belonging to a particular category, based on their attributes, enables a user to compare products and helps him/her to make the best choice. This is because the user may be interested in, for example, products of a well known brand, products sold at a particular store in his locality, products of a top selling styles, products on sale, newly introduced products and the like. Therefore, the relevance or goodness of a product belonging to a particular category needs to be determined based on these factors to achieve experiential relevance. The goodness value refers to the relevance of the product to users. In other words, the goodness value indicates how good a product is given the market characteristics. In other words, to provide the user the best choices.

In light of the above discussion, there is a need for a method for ranking the results for a query in online shopping such that it provides the best results to the user considering the market demand-supply characteristics of products in a product category.

SUMMARY

Various embodiments of the invention provide a method, system and computer program product for ranking of products related to a product category in online shopping. In order to determine the relevancy ranking of search results for a query, a set of attributes of the products related to a product category are extracted. Each attribute is given a composite score based on its features, and the attribute scores are combined to compute a Product Rank for a product. Examples of attributes include store selling the product, the brand associated with the product, style, price, and the like. Examples of features of the attribute store may include number of unique products offered by the store, network traffic ranking of that store, financials of the company that owns the store, number of users querying for the store, number of click-outs by users on products sold by the store and the like. The score of the attributes can be computed by analyzing the features by using various combinational functions. Depending on which features are used to compute the score for an attribute, the analysis can be termed as query dependent or query independent. The score of an attribute is an indicator of the demand for the product and hence a measure of goodness or relevance of the product.

Weights are then assigned to each attribute based on, for example, the importance of attributes given a product category for which ranking is to be done. For example, the brand may be more important for apparel products, as compared to craft supplies. Thereafter, a product rank based on the assigned weights is generated. The product rank is generated by using different combinational functions of the weights. The products are then sorted based on the product rank. The ranked results are displayed to a user.

In another embodiment of the invention, a "goodness" or relevance value of a product is calculated by using the scores of each attributes for the product independent of a search query. The goodness value indicates how good a product is for users given the market demand-supply characteristics. For example, in case of running shoes, Nike may be a preferred brand by twice the number of users as compared to Puma shoes. Accordingly, the goodness value of Nike may be greater than that of Puma. The goodness value for the product is dependant on the market demand-supply characteristics for the product. This is because the value of the features of the attributes is an indicator of the market demand for the product. The goodness value of the product is then used to generate rank for products which appear in search results for a search query by the user.

Ranking the products makes online shopping more convenient and time-efficient. Further, ranking the products belonging to a particular category based on their attributes enables a user to compare products and helps the user to make the best choice. Moreover, the invention performs a run-time attribute-wise analysis thereby, listing the best products at the top, according to the choice of the users.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF PREFERRED EMBODIMENTS

The present invention relates to a method and system for relevancy ranking in an information retrieval system. More specifically, it relates to ranking products in a category in online shopping. The measure of relevance is a numerical score assigned to each search result, indicating the degree of proximity of a search result to the information desired by a user. In online shopping, the products in a category may be ranked according to relevance, based on a user's search query, and different attributes of the product category, providing the best choice of products to the user. In one embodiment of the present invention, a method for generating a "goodness" or relevance value of a product independent of a search query is also provided. The goodness value indicates the market demand-supply characteristic of the product. The goodness value is computed based on analysis of different attributes of the product such as brand, store, price, and the like. The analysis is performed by using market demand-supply characteristics of the product.

In order to determine the relevance ranking of the search results of a query, a set of attributes of products belonging to the same category, are extracted. Features of each of these attributes are analyzed and accordingly a score is calculated for each attribute. Further, each of these attributes is analyzed separately and weights are assigned to each of them. Subsequently, a 'ProductRank' is calculated by combining the weights and the scores of each attribute, using various combinational functions. The results are displayed to the user, based on the ProductRank. The goodness value of the products may be used for generating a product rank. The goodness value is an indication of market and bulk user preferences whereas a product rank is specifically based on the particular search query made by a user and the market demand-supply characteristics.

Figure 1:
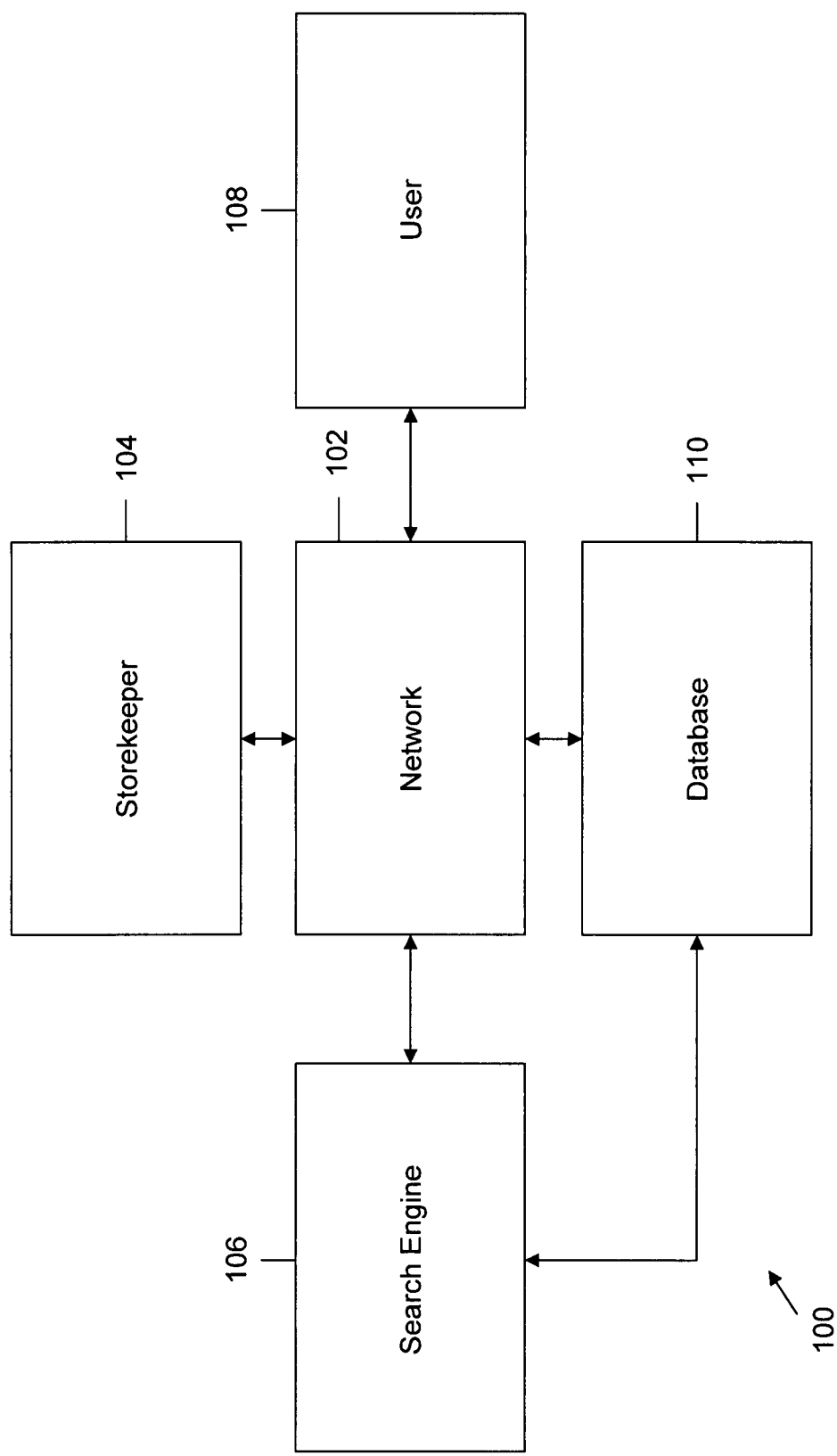
FIG. 1 is a block diagram of an environment in which various embodiments of the present invention may be practiced.

FIG. 1 is a block diagram of an environment 100 in which various embodiments of the present invention may be practiced. Environment 100 includes a network 102, a storekeeper 104, a search engine 106, a plurality of users 108, and a database 110. Storekeeper(s) 104, search engine 106, plurality of users 108 and database 110 are connected to network 102. Storekeeper 104 may post information about a store on network 102. For example, storekeeper 104 may launch a website of the store on the Internet or get the store registered in an online directory. User 108 queries search engine 106 to obtain information related to a product. Search engine 106 processes the search query to extract relevant product information stored in database 110. Database 110 is a comprehensive catalog of all online and offline product information collected from network 102. Further, search engine 106 executes the relevancy-ranking algorithm to provide the best choice of products to user 108. The relevancy rank is based on the attributes of the product category. This is explained in detail in conjunction with FIG. 2.

In various embodiments of the present invention, network 102 may be a wired or wireless network. Examples of network 102 include, but are not limited to, a Local Area Network (LAN), a Metropolitan Area Network (MAN), a Wide Area Network (WAN), and the Internet. Storekeeper 104 may be a data-processing unit or a human being. Examples of search engine 106 may include various search engines such as Google®, Yahoo®, TheFind®), and the like. Database 110 may be an independent database or a local database of search engine 106.

Figure 2:
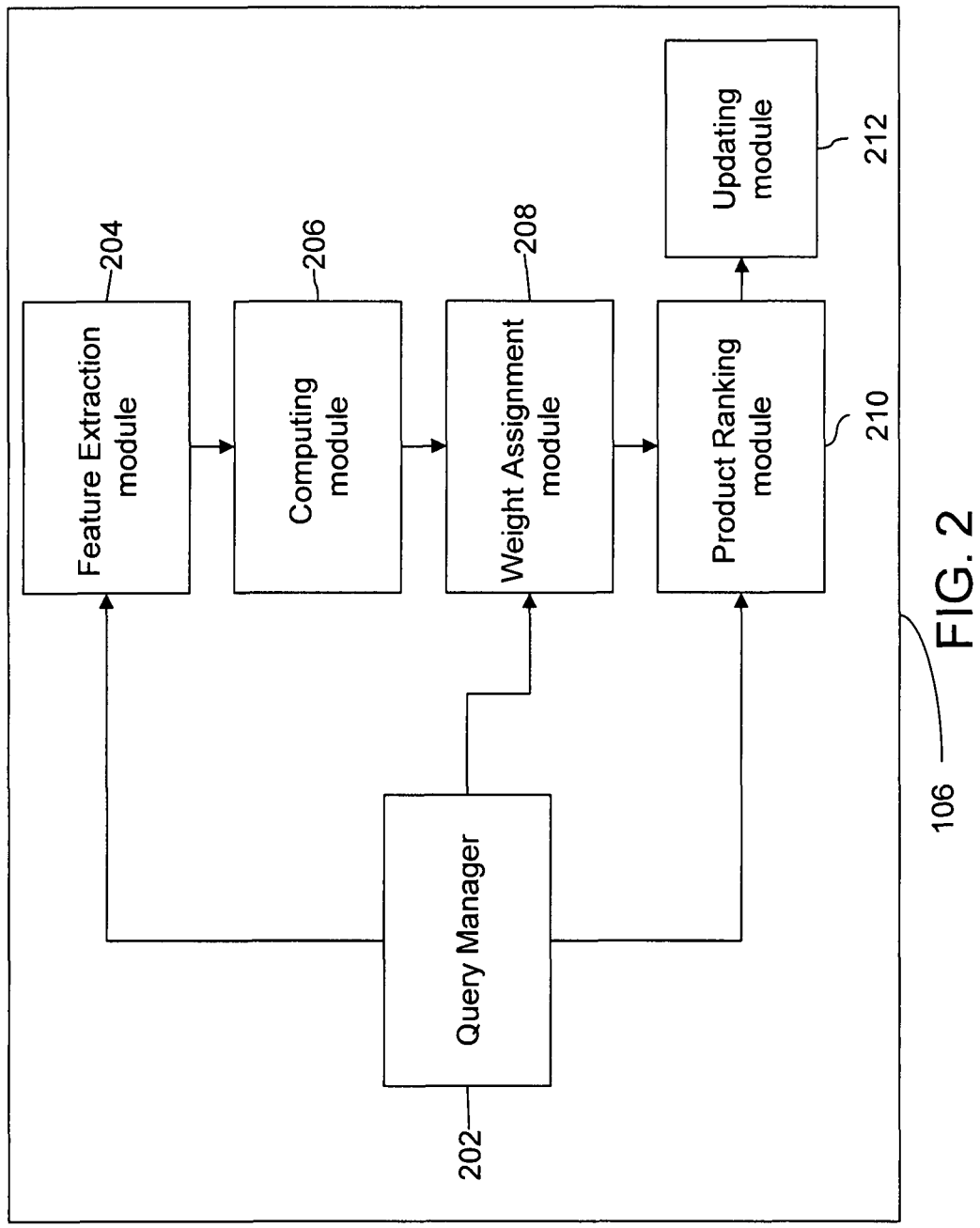
FIG. 2 is a block diagram of a system for relevancy ranking of products, in accordance with an exemplary embodiment of the present invention.

FIG. 2 is a block diagram of a system 200 for relevancy ranking of products, in accordance with an exemplary embodiment of the present invention. System 200 includes a query manager 202, a feature-extraction module 204, a computing module 206, a weight-assignment module 208 and a product-ranking module 210. Query manager 202 parses the query entered by user 108 and provides the parsed query to feature-extraction module 204. Feature-extraction module 204 identifies a set of attributes of a product category to which the product mentioned in the search query belongs and extracts a set of features for each attribute. Accordingly, each product is represented by a vector of attributes. The attributes of a product may include 'Store', 'Brand', 'Style', price, whether the product is on sale, and the like. Features of an attribute may include, for example, number of products sold by a store, number of different merchants selling a particular brand, and the like. Computing module 206 analyzes features of each attribute of the product category separately and computes a value for each feature. The analysis, for example, may refer to reviewing the number of times a particular entity has been cited by other users, either on network 102 or in an offline store, the number of click outs of a product, the network traffic ranking of a store selling the product and the like. Computing module 206 further calculates a score of each attribute based on the analysis of features. Weight assignment module 208 assigns weights to each attribute, based on the importance of an attribute for the product category. The importance may be decided based on the search query. Product-ranking module 210 combines the weights and the score of each attribute with the help of various combinational functions, and generates a ProductRank for each product in the category. Product-ranking module 210 then provides the calculated ProductRank to query manager 202, which sorts the products, based on the ProductRank. Accordingly, the search results of the query are displayed to user 108. In addition, system 200 also includes an updating module 212 which updates a product catalogue for a product periodically.

Feature-extraction module 204, computing module 206, weight-assignment module 208, and product-ranking module 208 and updating module 212 interact with database 110.

In one embodiment of the invention, a goodness or relevance value for each product in database 110 is generated by feature extraction module 204 and computing module 206 independent of the search query. For each product, feature extraction module 204 defines attributes and computing module 206 computes a score for each attribute based on the market demand-supply characteristics for the product. The market demand-supply are determined by using the features of the attributes. For example, features such as number of products selling for each brand, financial details of a store are an indication of the market dynamics and accordingly consumer demand. Computing module 206 further combines the scores for each attribute to generate the goodness or relevance value for the product. In one embodiment of the invention, the goodness value of a product is used for generating a rank of the product in a product category.

In various embodiments of the present invention, query manager 202, feature-extraction module 204, computing module 206, weight-assignment module 208 and product-ranking module 210 may be present within search engine 106. In various embodiments of the present invention, the different elements of system 200, such as query manager 202, feature-extraction module 204, computing module 206, weight-assignment module 208, product-ranking module 210 and updating module 212 may be implemented as a hardware module, a software module, firmware, or a combination thereof. The functionalities of different modules of system 200 are explained in detail with the help of FIG. 3.

Figure 3:
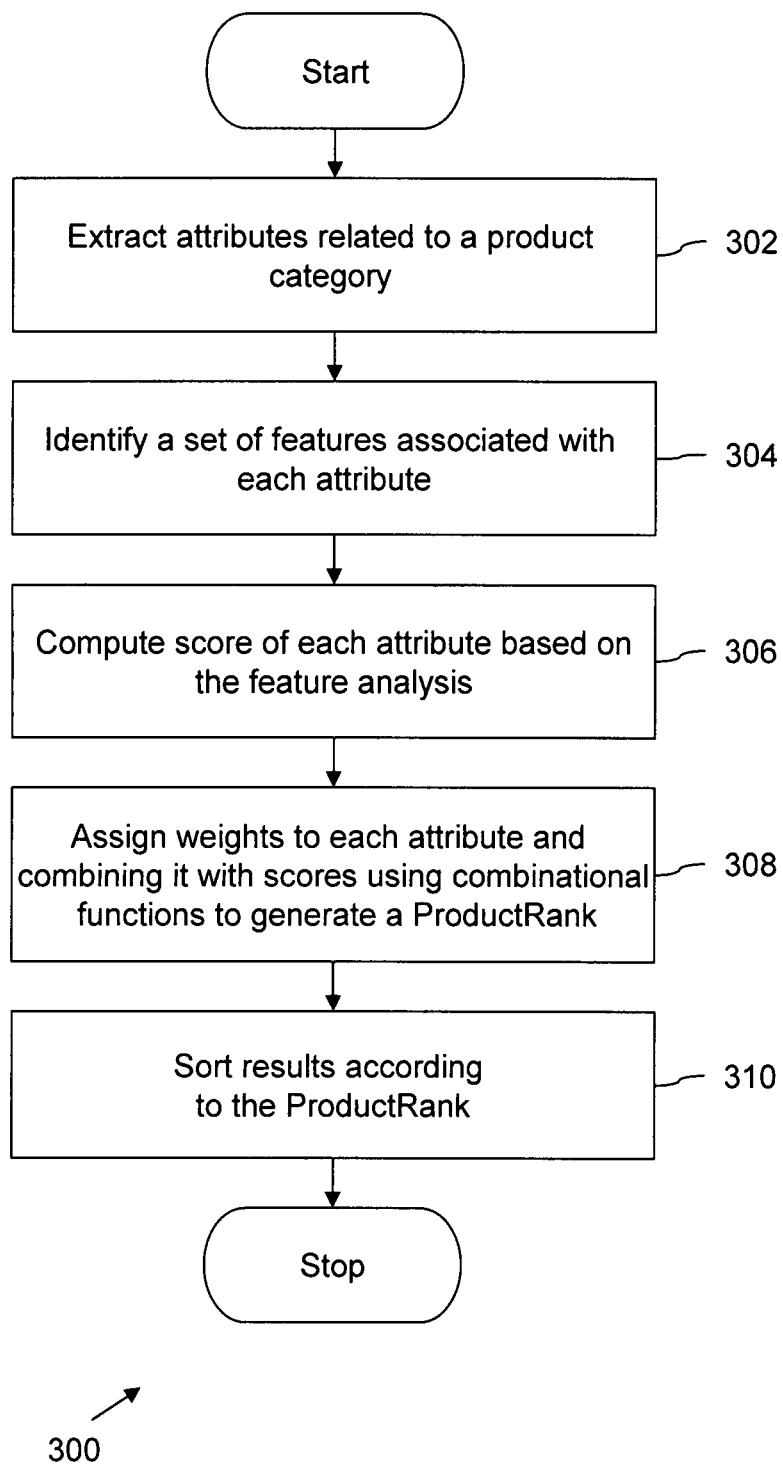
FIG. 3 is a flowchart of a method for relevancy ranking of products, in accordance with an exemplary embodiment of the present invention.

FIG. 3 is a flowchart of a method for relevancy ranking of products, in accordance with an exemplary embodiment of the present invention. At step 302, a set of attributes of the product category to which the search query belongs is extracted. For example, a query such as 'dress shirt' entered by user 108 may belong to the category of 'shirts and tops'. The set of attributes related to shirts and tops may include the name of the store selling the shirt, the brand, the style, the trend (the current preferred style by large numbers of users), the price, whether it is on-sale, whether it is a new launch and the like. At step 304, a set of features for each attribute are identified. For example, for store, the set of features may include number and variety of unique dress shirt provided by the store, financials of the company which owns the store, merchant reviews for that site, network traffic ranking of the store, number of users querying for that store, number of click-outs by users on products from that store (click-outs refers to the percentage of times people click on products from that store) and the like. The first feature is query dependent and the remaining features are query independent. Similarly, the features of brand attribute may include both query dependent and independent features like the number of merchants selling the brand, the quality of merchants carrying that brand, the range of designs available in the brand, the quality of the products of the brand, the prices of that brand, how many times users query for that brand, how many users click on that brand when it is shown to them, and the like. In some embodiments of the invention, a query independent or a query dependant analysis may be preformed. For example, query independent analysis at the category level indicates that Dicks Sporting Goods is a top store for shirts category and Nike is a top brand. However, a query dependent analysis performed on the products which match the query "dress shirt" with high scores indicates that Van Heusen and Arrow are better brands than Nike, and Nordstrom & Lands End are better stores than Dicks Sporting Goods for "dress shirts".

At step 306, the features of each attribute are analyzed to assign a score to each attribute. For example, for the 'brand' attribute, the feature analysis may indicate that a particular brand of shirts has been viewed by users the maximum number of times on the Internet; therefore, the high score may be assigned to that brand. In various embodiments of the invention, score of a 'brand', may be based on different brand features mentioned above. Similarly, the score of a store may be calculated based on a number of store features mentioned above. However, in various embodiments of the invention, in order to avoid the entry of stores with large portfolios of products, such as Wal-Mart, or stores that provide a marketplace to sell a variety of products, such as EBay, such stores are assigned a lower rating by the idf (inverted document frequency) factor in the feature analysis. The inverted document frequency refers to number of occurrences of particular terms in a document. In particular, idf is a measure of the general importance of a term in the search query. This is obtained by dividing the number of all documents by the number of documents containing the term, and then taking the logarithm of that quotient. In various embodiments of the invention, the score of an attribute can also be calculated with reference to the score of other attribute using an iterative analysis. For example, score of 'brand' can be calculated given the score of 'store'. This is explained in detail in conjunction with an example described in subsequent paragraphs.

Thereafter, at step 308, weights are assigned to each of the attributes and weights are combined with the scores by using combinational functions to generate a ProductRank for each product in the category. For example, a combinational function may be a linear combination. Thereafter, at step 310, the results of the search query are sorted according to the ProductRank. The products in the category are ranked according to their respective ProductRanks. The method and system described above may be explained with the following example.

A user may query the search engine for a product such as shirts. The key attributes related to shirts that may be considered for relevancy ranking include the name of the store, the brand, and the style. The search engine will search its database for all documents which are shirts, and analyze their attributes. The feature analysis for the store attribute identifies that Macy's, Kohls and Walmart are the top three stores for the shirts category. The scores assigned to these stores may be 5, 3 and 2, respectively. Similarly, Van Heusen, Ralph Lauren and Land's End may be the top three brands with scores 4, 3 and 1, respectively. Further, the style attribute may include striped shirts, plain shirts and check-patterned shirts with scores 5, 3 and 1, respectively, as the top three styles. Using 50 percent, 35 percent and 15 percent as the relative importance of the store, brand and style attributes, respectively, and combining the scores of these attributes according to linear weighting, the ProductRank of the shirts is generated as below:

Shirt 1: [Macy's, Land's End, Striped]

$$ProductRank=(0.5*5)+(0.35*1)+(0.15*5)=3.60$$

Shirt 2: [Modells, Ralph Lauren, Striped]

$$ProductRank=(0.5*2)+(0.35*3)+(0.15*5)=2.80.$$

Shirt 3: [Walmart, Van-Heusen, Plain]

$$ProductRank=(0.5*3)+(0.35*4)+(0.15*3)=3.35$$

Hence, shirt 1, shirt 3 and shirt 2 will be the order of listing the results after sorting is completed. In this example, the scores for each attribute is calculated independent of each other.

Another method to generate the product rank using a different combinational function is explained as follows. In this method, a score of an attribute is calculated and weight is assigned to the attribute based on the score and then a combination function is used to generate the product rank. Further, the score of an attribute is calculated independently based on its features, and then the score of other attributes are calculated based on the score of the independent attribute.

For example, the score of each store is determined independently and, based on this score, the scores of other attributes brand, style and the like are determined. The features of store may include number of unique products carried by the store, the idf factor of the store, online traffic ranking of the store, financials of the company owning the store, number of click outs, user query and the like. In these features, the number of user click outs and the user query account for the user behavior or user interest aspects. To calculate the score of the store, the distribution of the values of each feature is obtained and the distribution curve is smoothened. The distribution may be smoothened by taking logarithm of the values. These values are then normalized and combined with weights to calculate the score of the store. The score of the store is calculated using the following equation:

$$\text{Score of Store} = \Sigma W_i * F(G(X_i))$$

where $W_i$ is the weight of $i^{th}$ feature of the attribute

F—represents the smoothening function
G—represents the Normalization function
$X_i$—is the value of the $i^{th}$ feature Accordingly, the score of the attribute brand is calculated with respect to the score of the attribute store by using a brand-store affinity matrix. The brand-store affinity matrix is represented as:

|       | Store |       |
|-------|-------|-------|
| Brand | X | Y |
| A | AX - (Score of the store X * number of items of the brand A available in the store X) | AY - (Score of the store Y * number of items of the brand A available in the store Y) |
| B | BX - (Score of the store X * number of items of the brand B available in the store X) | BY - (Score of the store X * number of items of the brand B available in the store Y) |

In the above matrix, A and B represents two brands and X and Y represent two stores selling products of these brands. Using the above affinity matrix the score of each brand is calculated. For example, the score of brand A is sum of AX and AY. Further, weights can be assigned with each brand and using the weights the score of the brand can be calculated. This provides additional score to the brands which are being carried by top ranked stores.

Similarly, scores of other attributes Style, On-sale, New or not is calculated with respect to the score of store. Accordingly, the rank of a product is calculated by combining the scores of each attribute.

$$\text{Product Rank} = \Sigma W_i S_i$$

Where
$W_i$—Weight assigned to each attribute
$S_i$—Score of each attribute

In various embodiments of the invention, the score of the attributes can be estimated using a similar method with reference to other attributes such as brand, style, and the like. The base attribute with reference to which score of other attributes is calculated can be decided based on the category of a product. For example, for Shirts, brand is more important than style or on-sale attribute and hence, first score of brand may be calculated independently and then the scores of other attributes may be calculated based on the score of the brand.

In an embodiment of the invention, if the query also includes an attribute, along with the product category, then that attribute acts as a filter and the relative ranking of the results remains the same. For example, if the query is 'Lee shirts', then the brand attribute is removed while calculating the ProductRank.

In another embodiment of the invention, the product category mentioned in the search query may have no relevant attributes, for example, 'socks', where attributes such as store, style and trend do not matter much to the users. In such cases, the sales factor may be considered for ranking the search results. Hence, the relevant choice of attributes is important depending on the category or the query.

In various embodiments of the invention, the ranking of products is dynamic, since database 110, which is a catalogue of the products that are available online or offline, is updated periodically with information from network 102. The ranking of products is carried out for a specific duration of time. For example, ranking of products may change according to season. For example, a best-selling woolen shirt brand may not necessarily be the best-selling cotton shirt brand. Hence, the ranking for each attribute is modified by recalculating the weights and generating a new ProductRank.

In accordance with various embodiments of the invention, a goodness or relevance value of the products in database 110 is calculated without considering the search query. The goodness value of the product is estimated by defining the attributes for a product category and then analyzing the attributes based on the value of features as explained in the method described in FIG. 3. The value of the features is determined using the market demand-supply characteristics for the product. The market demand-supply characteristics includes the number of products being sold for each brand, the quality of products of a brand, the financials of a store selling the product, the range of designs available in the brand and the number of click-outs by a user and the like. For example, number of products selling for each brand indicates the demand for the product. The goodness value of the product is calculated by combining the score of each attribute. Any combinational function as described above may be used to generate the goodness value. The goodness value of the product is then used to rank the search results of a query.

The above method and system thus performs the product analysis at multiple level of granularity, i.e., at product category level and at query level. The query level analysis is performed in conjunction with the product category level analysis. The method and system described above have a number of advantages. The method provides relevancy ranking in an online shopping system, performing attribute-wise ranking of a product category. Thereby, the method lists the best products in the list at the top, according to the choice of the users, thus providing experiential relevance The results of a search query processed by using the method described above, in accordance with an embodiment of the invention, may be presented to the user in a variety of ways. By way of example only, the results of a search query 'dress shirt' may list dress shirts in different price ranges offered by various stores. Further, an image may be provided for each result to facilitate the selection of a desired dress shirt. The search results page may also list top selling brands and top selling styles related to shirts for user's reference. These are based on the market demand-supply characteristics. In other words, the popularity of a brand or style.

The system for relevancy ranking of products in an online shopping system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer also comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from many other databases. The communication unit includes a modem, an Ethernet card, or any similar device, which enables the computer system to connect to databases and networks such as LAN, MAN, WAN and the Internet. The computer system facilitates inputs from a user through an input device that is accessible to the system through an I/O interface.

The computer system executes a set of instructions that are stored in one or more storage elements, in order to process the input data. The storage elements may also hold data or other information, as desired, and may be in the form of an information source or a physical memory element in the processing machine.

The present invention may also be embodied in a computer program product for ranking one or more products related to a product category in online shopping. The computer program product comprises a computer usable medium having a computer readable program code embodied therein for ranking of one or more products related to a product category in online shopping.

The set of instructions may include various commands instructing the processing machine to perform specific tasks such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. The processing of input data by the processing machine may be in response to a user's commands, the results of previous processing, or a request made by another processing machine. The instructions are supplied by various well known programming languages and may include object oriented languages such as C++, Java, and the like.

The present invention may also be embodied in a computer program product for ranking one or more products related to a product category in online shopping. The computer program product includes a computer readable medium having program instructions comprising a program code for generating ranks of one or more products.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for ranking one or more products in online shopping, the method comprising the steps of:
   a) receiving a keyword search query for the one or more products, the one or more products being associated with a product category;
   b) identifying one or more attributes, based on receiving the keyword search query, related to the product category, the one or more attributes comprising at least one of a brand name, a store name, a style, and price;
   c) selecting one of the one or more identified attributes as a base attribute, wherein the base attribute is selected based on the product category;
   d) identifying one or more features corresponding to the base attribute, the one or more features comprising query independent features and query dependent features;
   e) computing a normalized score of each of an attribute instance of the base attribute for each product in the product category, the normalized score being computed based on the value associated with each of the one or more features associated with the base attribute, wherein the value of the one or more features is determined based on a query dependent and a query independent analysis of the one or more features, the normalized score being computed using one or more mathematical functions;
   f) computing a normalized score of each of an attribute instance of the one or more attributes other than the base attribute for each product in the product category, the normalized score being computed based at least in part on the normalized score of the corresponding base attribute instance of each product, the normalized score being computed using one or more mathematical functions and an attribute affinity matrix, wherein the attribute affinity matrix comprises one or more values, for the attribute instance of the one or more attributes other than the base attribute, calculated based on normalized scores of the attribute instances of the base attribute;
   g) assigning weights to each of the one or more attributes based on the relative importance of each of the one or more attributes for the product category and the keyword search query;
   h) generating a product rank for each of the one or more products in the product category based on the assigned weights of the one or more attributes and the scores of each attribute instance using a predefined relevancy-ranking algorithm; and
   i) displaying a rank ordered list of the one or more products, wherein the steps of the method are performed by a microprocessor.

2. The method of claim 1, wherein the predefined relevancy-ranking algorithm comprises combinational functions.

3. The method of claim 1 further comprising the step of computing the value of the one or more features of the base attribute, wherein the value is computed by the microprocessor.

4. The method of claim 1 further comprising the step of sorting the one or more products based on the product rank, wherein the one or more products are sorted by the microprocessor.

5. The method of claim 1 further comprising the step of updating a product catalogue of the one or more products.

6. The method according to claim 1, wherein the one or more features associated with the brand attribute is at least one of quality of the one or more products of a brand name, the range of designs available in the brand, and the number of merchants selling the brand.

7. The method according to claim 1, wherein the one or more features associated with the store attribute is at least one of a network traffic ranking of a store, number of users querying for the store, number of click-outs by users on products sold by the store, financials of the store, payment methods accepted by the store, website security and trust ranking of the store, and local presence of the store.

8. The method according to claim 1, wherein the query-dependent analysis of a feature associated with at least one attribute instance is performed based on at least one keyword mentioned in the keyword search query of the user.

9. The method according to claim 1, wherein the one or more features are associated with market demand-supply characteristics for the product, wherein the one or more features associated with the market demand-supply characteristics for the product are at least one of quality of the one or more products of a brand, the range of designs available in the brand, the number of merchants selling products by the brand and quality and financials of the merchants selling the products.

10. The method according to claim 9, wherein the one or more features associated with the market demand characteristics for the product are at least one of a network traffic ranking of a store, number of users querying for the store, and number of click-outs by users on products sold by the store.

11. The method of claim 1, wherein the attribute affinity matrix corresponds to a brand-store affinity matrix, and wherein the base attribute is store.

12. The method of claim 11, wherein the brand-store affinity matrix comprises the one or more values, for one or more instances of the brand, calculated based on normalized scores of one or more instances of the store.

13. The method of claim 12, wherein a value, of the one or more values, corresponding to an attribute instance of the brand, represents a product of a normalized score of an instance of store and the number of products of the instance of the brand available in the instance of the store.

14. The method of claim 12, wherein the normalized scores of the one or more instances of the brand are calculated based on the one or more values corresponding to an attribute instance of the brand.

15. The method of claim 14 further comprising the step of assigning a weight to each of the one or more instances of the brand, wherein a normalized score of the brand is calculated based on the normalized scores of the one or more instances of the brand and the weights associated with the one or more instances of the brand.

16. The method of claim 1, wherein computing the normalized score of each of the attribute instance of the base attribute comprises:
   a) smoothening a distribution curve of the values of the one or more features of the attribute instance of the base attribute, the smoothening being performed by obtaining logarithm of the values of the one or more features of the attribute instance of the base attribute;
   b) normalizing the values of the one or more features by applying a normalization function; and
   c) computing the normalized score based on a product of a weight and the associated normalized value of each of the one or more features.

17. A method for determining a goodness value for a product in online shopping, the goodness value being determined independent of a keyword search query, the method comprising the steps of:
   a) identifying, one or more attributes related to the product based on a product category associated with the product, the one or more attributes comprising at least one of a brand name, a store name, a style, and price;
   b) identifying one or more features associated with each of the corresponding one or more attributes;
   c) computing a normalized score for each of an attribute instance of the one or more attributes for each of the product in the product category based on a value associated with each of the one or more features and the product category, the value of the one or more features being associated with market demand-supply characteristics for the product, wherein the normalized score for each of the attribute instance is computed independent of an user input, the normalized score being computed using one or more mathematical functions, wherein computing the normalized score for each of an attribute instance of the one or more attributes comprises:
      i) selecting one of the one or more identified attributes as a base attribute based on the product category,
      ii) computing a normalized score of each of an attribute instance of the base attribute for each product in the product category, and
      iii) computing normalized scores of the attribute instances of the attributes other than the base attribute based, at least in part, on an attribute affinity matrix, wherein the attribute affinity matrix comprises one or more values, for the attribute instances of the attributes other than the base attribute, calculated based on the normalized scores of the attribute instances of the base attribute;
   d) combining the scores of each attribute instance of the one or more attributes by using combinational functions to generate the goodness value for the product, wherein the goodness value is an indication of market and bulk user preferences; and
   e) storing the goodness value in a database; wherein one or more products in response to a key word search query are retrieved from the database based on the corresponding goodness value, the steps of the method (a-e) being performed by a microprocessor and independent of the search terms in the key word search query.

18. The method of claim 17, wherein the one or more features associated with the market supply characteristics comprises the number of products being sold for each brand, the quality of products of a brand, and the financials of a store selling the product.

19. The method of claim 17 further comprising sorting product search results for a query using the goodness value of products in the search results, wherein the search results are sorted by the microprocessor.

20. The method according to claim 17, wherein the one or more features associated with market demand characteristics are at least one of network traffic ranking of a store, number of users querying for the store, number of click-outs by users on products sold by the store and the range of designs available in the brand.

21. The method of claim 17, wherein the attribute affinity matrix corresponds to a brand-store affinity matrix, and wherein the base attribute is store.

22. The method of claim 21, wherein the brand-store affinity matrix comprises the one or more values, for one or more instances of the brand, calculated based on normalized scores of one or more instances of the store.

23. The method of claim 22, wherein a value, of the one or more values, corresponding to an attribute instance of the brand, represents a product of a normalized score of an instance of store and the number of products of the instance of the brand available in the instance of the store.

24. The method of claim 22, wherein the normalized scores of the one or more instances of the brand are calculated based on the one or more values corresponding to an attribute instance of the brand.

25. The method of claim 24 further comprising the step of assigning a weight to each of the one or more instances of the brand, wherein a normalized score of the brand is calculated based on the normalized scores of the one or more instances of the brand and the weights associated with the one or more instances of the brand.

26. The method of claim 17, wherein computing the normalized score of each of the attribute instance of the base attribute comprises:
   a) smoothening a distribution curve of the values of the one or more features of the attribute instance of the base attribute, the smoothening being performed by obtaining logarithm of the values of the one or more features of the attribute instance of the base attribute;

b) normalizing the values of the one or more features by applying a normalization function; and
c) computing the normalized score based on a product of a weight and the associated normalized value of each of the one or more features.

27. A system for ranking one or more products in online shopping, the system comprising:
a) a microprocessor;
b) a query manager, the query manager configured for interacting with the microprocessor to receive a keyword search query for the one or more products, the one or more products being associated with a product category;
c) a feature extraction module, the feature extraction module configured for interacting with the microprocessor to identify one or more attributes related to the product category and to identify one or more features corresponding to each of the one or more attributes for each of the one or more products based on receiving the keyword search query, the one or more attributes comprising at least one of a brand name, a store name, a style, and price, the one or more features comprising query independent features and query dependent features;
d) a computing module, the computing module configured for interacting with the microprocessor to compute:
   (i) a normalized score of each of an attribute instance of a base attribute for each product in the product category, the normalized score being computed based on the value associated with each of the one or more features associated with the base attribute, wherein the value of the one or more features is determined based on a query dependent and a query independent analysis of the one or more features, the normalized score being computed using one or more mathematical functions, wherein the base attribute is selected from the one or more attributes based on the product category; and
   (ii) a normalized score of each of an attribute instance of the one or more attributes other than the base attribute for each product in the product category, the normalized score being computed based at least in part on the normalized score of the corresponding base attribute instance of each product, the normalized score being computed using one or more mathematical functions and an attribute affinity matrix, wherein the attribute affinity matrix comprises one or more values, for the attribute instance of the one or more attributes other than the base attribute, calculated based on normalized scores of the attribute instances of the base attribute;
e) a weight assignment module, the weight assignment module configured for interacting with the microprocessor to assign weights to each of the one or more attributes based on the relative importance of each of the one or more attributes for the product category and the keyword search query; and
f) a product ranking module, the product ranking module configured for interacting with the microprocessor to generate a product rank for each of the one or more products in the product category based on the assigned weights of the one or more attributes and the scores of each attribute instance using a predefined relevancy-ranking algorithm, wherein the rank ordered list of the one or more products are displayed.

28. The system of claim 27, wherein the computing module is configured for interacting with the microprocessor to compute the value of the one or more features of the one or more attributes.

29. The system of claim 27 further comprising a sorting module, the sorting module being configured for interacting with the microprocessor to sort the one or more products based on the product rank.

30. The system of claim 27 further comprising an updating module, the updating module being configured for interacting with the microprocessor to update a product catalogue of the one or more products periodically.

31. The system of claim 27 wherein the one or more features comprises at least one of quality of the one or more products of a brand, the range of designs available in the brand, the number of merchants selling the brand, the financials of the merchants selling the products, the number of different types of products sold by a store, network traffic ranking of a store, number of users querying for the store and number of click-outs by a user.

32. The system of claim 27, wherein the attribute affinity matrix corresponds to a brand-store affinity matrix, and wherein the base attribute is store.

33. The system of claim 32, wherein the brand-store affinity matrix comprises the one or more values, for one or more instances of the brand, calculated based on normalized scores of one or more instances of the store.

34. The system of claim 33, wherein a value, of the one or more values, corresponding to an attribute instance of the brand, represents a product of a normalized score of an instance of store and the number of products of the instance of the brand available in the instance of the store.

35. The system of claim 33, wherein the computing module computes normalized scores of the one or more instances of the brand based on the one or more values corresponding to an attribute instance of the brand.

36. The system of claim 35, wherein the computing module assigns a weight to each of the one or more instances of the brand, wherein a normalized score of the brand is calculated based on the normalized scores of the one or more instances of the brand and the weights associated with the one or more instances of the brand.

37. The system of claim 27, wherein the computing module, to compute the normalized score of each of the attribute instance of the base attribute, interacts with the microprocessor to perform the steps of:
a) smoothening a distribution curve of the values of the one or more features of the attribute instance of the base attribute, the smoothening being performed by obtaining logarithm of the values of the one or more features of the attribute instance of the base attribute;
b) normalizing the values of the one or more features by applying a normalization function; and
c) computing the normalized score based on a product of a weight and the associated normalized value of each of the one or more features.

38. A computer program product for use with a computer, the computer program product comprising a non-transitory computer usable medium having a computer readable program code embodied therein for ranking of one or more products in online shopping, the computer readable program code performing the steps of:
a) receiving a keyword search query for the one or more products, the one or more products being associated with a product category;
b) identifying one or more attributes, based on receiving the keyword search query, related to the product category, the one or more attributes comprising at least one of a brand name, a store name, a style, and a price;
c) selecting one of the one or more identified attributes as a base attribute, wherein the base attribute is selected based on the product category;
d) identifying one or more features corresponding to the base attribute, the one or more features comprising query independent features and query dependent features;
e) computing a normalized score of each of an attribute instance of the base attribute for each product in the product category, the normalized score being computed based on the value associated with each of the one or more features associated with the base attribute, wherein the value of the one or more features is determined based on a query-dependent and a query-independent analysis of the one or more features, the normalized score being computed using one or more mathematical functions;
f) computing a normalized score of each of an attribute instance of the one or more attributes other than the base attribute for each product in the product category, the normalized score being computed based at least in part on the normalized score of the corresponding base attribute instance of each product, the normalized score being computed using one or more mathematical functions and an attribute affinity matrix, wherein the attribute affinity matrix comprises one or more values, for the attribute instance of the one or more attributes other than the base attribute, calculated based on normalized scores of the attribute instances of the base attribute;
g) assigning weights to each of the one or more attributes based on the relative importance of each of the one or more attributes for the product category and the keyword search query;
h) generating a product rank for each of the one or more products in the product category based on the assigned weights of the one or more attributes and the scores of each of the attribute instance using a predefined relevancy-ranking algorithm; and
i) displaying a rank ordered list of the one or more products, wherein the computer program product interacts with a microprocessor for executing the computer readable program code.

39. The computer program product of claim 38, wherein the computer readable program code further performing the step of sorting the one or more products based on the product rank.

40. The computer program product of claim 38 further performing the step of updating a product catalogue of the one or more products periodically.

41. The computer program product of claim 38, wherein the attribute affinity matrix corresponds to a brand-store affinity matrix, and wherein the base attribute is store.

42. The computer program product of claim 41, wherein the computer readable program code further performs the step of computing the one or more values, for one or more instances of the brand, in the brand-store affinity matrix, based on normalized scores of one or more instances of the store.

43. The computer program product of claim 42, wherein a value, of the one or more values, corresponding to an attribute instance of the brand, represents a product of a normalized score of an instance of store and the number of products of the instance of the brand available in the instance of the store.

44. The computer program product of claim 42, wherein the normalized scores of the one or more instances of the brand are calculated based on the one or more values corresponding to an attribute instance of the brand.

45. The computer program product of claim 44, wherein the computer readable program code further performs the step of assigning a weight to each of the one or more instances of the brand, wherein a normalized score of the brand is calculated based on the normalized scores of the one or more instances of the brand and the weights associated with the one or more instances of the brand.

46. The computer program product of claim 38, wherein computing the normalized score of each of the attribute instance of the base attribute comprises the steps of:
   a) smoothening a distribution curve of the values of the one or more features of the attribute instance of the base attribute, the smoothening being performed by obtaining logarithm of the values of the one or more features of the attribute instance of the base attribute;
   b) normalizing the values of the one or more features by applying a normalization function; and
   c) computing the normalized score based on a product of a weight and the associated normalized value of each of the one or more features.

47. A computer program product for use with a computer, the computer program product comprising a non-transitory computer usable medium having a computer readable program code embodied therein for determining a goodness value for a product in online shopping, the goodness value being determined independent of a keyword search query, the computer readable program code performing the steps of:
   a) identifying one or more attributes related to the product based on a product category associated with the product, the one or more attributes comprising at least one of a brand name, a store name, a style, and price;
   b) identifying, one or more features associated with each of the corresponding one or more attributes;
   c) computing a normalized score for each of an attribute instance of the one or more attributes for each of the product in the product category based on a value associated with each of the one or more and the product category, the value of the one or more features being associated with market demand-supply characteristics for the product, wherein the normalized score for each of the attribute instance is computed independent of an user input, the normalized score being computed using one or more mathematical functions, wherein computing the normalized score for each of an attribute instance of the one or more attributes comprises:
      i) selecting one of the one or more identified attributes as a base attribute based on the product category,
      ii) computing a normalized score of each of an attribute instance of the base attribute for each product in the product category, and
      iii) computing normalized scores of the attribute instances of the attributes other than the base attribute based, at least in part, on an attribute affinity matrix, wherein the attribute affinity matrix comprises one or more values, for the attribute instances of the attributes other than the base attribute, calculated based on the normalized scores of the attribute instances of the base attribute;
   d) combining the scores of each attribute instance of the one or more attributes by using combinational functions to generate the goodness value for the product, wherein the goodness value is an indication of market and bulk user preferences; and
   e) storing the goodness value in a database, wherein one or more products in response to a keyword search query are retrieved from the database based on the corresponding goodness value, the steps of the method (a-e) being performed independent of the search terms in the key word search query, wherein the computer program product interacts with a microprocessor for executing the computer readable program code.

48. The computer program product of claim 47, wherein the attribute affinity matrix corresponds to a brand-store affinity matrix, and wherein the base attribute is store.

49. The computer program product of claim 48, wherein computer readable program code further performs the step of computing the one or more values, for one or more instances of the brand, in the brand-store affinity matrix, based on normalized scores of one or more instances of the store.

50. The computer program product of claim 49, wherein a value, of the one or more values, corresponding to an attribute instance of the brand, represents a product of a normalized score of an instance of store and the number of products of the instance of the brand available in the instance of the store.

51. The computer program product of claim 49, wherein the normalized scores of the one or more instances of the brand are calculated based on the one or more values corresponding to an attribute instance of the brand.

52. The computer program product of claim 51, wherein the computer readable program code further performs the step of assigning a weight to each of the one or more instances of the brand, wherein a normalized score of the brand is calculated based on the normalized scores of the one or more instances of the brand and the weights associated with the one or more instances of the brand.

53. The computer program product of claim 47, wherein computing the normalized score of each of the attribute instance of the base attribute comprises the steps of:
  a) smoothening a distribution curve of the values of the one or more features of the attribute instance of the base attribute, the smoothening being performed by obtaining logarithm of the values of the one or more features of the attribute instance of the base attribute;
  b) normalizing the values of the one or more features by applying a normalization function; and
  c) computing the normalized score based on a product of a weight and the associated normalized value of each of the one or more features.

* * * * *